Sept. 15, 1964   J. P. ECKERT, JR., ETAL   3,149,285
RING COUNTER WITH PARALLEL INPUT TO CATHODES
FROM PULSE STANDARDIZER
Original Filed June 26, 1947

Basic Ring Counter

Pulse Standardizer

INVENTORS
John Presper Eckert, Jr.
John W. Mauchly

BY William D. Hall
ATTORNEY

United States Patent Office 3,149,285
Patented Sept. 15, 1964

3,149,285
RING COUNTER WITH PARALLEL INPUT TO
CATHODES FROM PULSE STANDARDIZER
John Presper Eckert, Jr., Gladwyne, and John W.
Mauchly, Ambler, Pa., assignors to Sperry Rand
Corporation, New York, N.Y., a corporation of
Delaware
Original application June 26, 1947, Ser. No. 757,158, now
Patent No. 3,120,606, dated Feb. 4, 1964. Divided
and this application Oct. 3, 1963, Ser. No. 313,544
2 Claims. (Cl. 328—43)

This invention is a division of our application S.N. 757,158, filed June 26, 1947, now Patent No. 3,120,606, and relates to electronic mechanism for registering and storing electrical signals representative of intelligible data, and more particularly to improved apparatus and method of operation for counting and storing successive electrical pulses at high frequency whereby the pulses may be counted and registered with maximum accuracy.

Although the pulse register is adapted for receiving any intelligence which may be transmitted by electrical pulses, the disclosed embodiment shows the register adapted to receive data based on the decimal system of numerical notation. A plurality of high vacuum electron tubes, each representing a digit in a denominational order of the decimal system of numerical notation, are so coupled in a network as to be responsive in step-by-step fashion to each of a plurality of electrical impulses commonly impressed on such network at high frequency.

The disclosed embodiment of an electrical pulse counter and storer, or memory, is utilized in a plurality of different forms, all employing the same basic principle, in our copending application for U.S. Letters Patent, Serial Number 757,158, filed June 26, 1947, for Electronic Numerical Integrator and Computer, termed Eniac, now Patent No. 3,120,606.

A serious obstacle to the successful construction of an electronic computing machine of satisfactory accuracy and reliability has been the tendency for parasitic signals and other manifestations to develop, due to the reactances inherent in interconnection circuits, and it is an important aim of this invention to prevent such parasitic impairment of the proper response of the machine to the significant pulses for either numerical effect, or for control and timing of computative operations.

Another difficulty which it is a purpose of the invention to overcome in a novel way, is the tendency for signals to become distorted as to potential, duration, and shape (as recorded by the oscilloscope) by interferences, capacitative or inductive. In this direction a novel approach has been effected by not transmitting properly timed pulses of numerical or control significance through the various conductors from the initiating device directly to the one which is to respond, but instead to stimulate operation of a gate or pulse former device of very definite pulse forming characteristics at the input of the responding device.

As a consequence of the foregoing, in our invention at each introduction of data to an arithmetic unit, an original shaping of the pulse received by that unit is effected by the unit itself.

It is an important aim of the invention to devise a novel means of preserving the definite and highly effective form of signal information transmitted to or through the various parts of the system and which will have standard pulse forms and potentials at all stages of operations and registering caused by such pulses.

An object of the invention is to organize the elements of the machine so as to eliminate functions of such nature that they might be materially affected by variations of operating conditions such as often occur. The machine is thus adapted to practically infallible operation under varying conditions which extensive experience has shown may be expected to be manifest in such machines over a reasonable period of operation.

For instance, it is an attainment of the invention that electron emission high vacuum tubes such as common triodes or pentodes, used in radio receivers, are made use of as switching devices in such manner that their operation occurs in a condition far from the critical point between conduction and nonconduction, and so that deterioration in the tube elements or the state of the space therein over a period of months, will not materially affect the response of the tube to control potentials applied to the grids as pulses or potentials of substantial values.

It is a related aim to use such tubes as switches or other kinetic equivalents in such manner that their function will be either conducting or non-conducting, accompanying this by use of the tubes at or close to saturation for their conducting state, and with a grid bias well below the critical point for their non-conducting state. This also permits use of tubes of high $m\mu$ and low capacitance in order to establish great certainty of operation and response generally. In this way aggregated reactances between trunk lines and other conductors and between electrodes of the tubes are not sufficient to distort transmitted signals materially or to set up parasitic pulses of sufficient degree to cause malfunction.

While electronic ring counters have been evolved utilizing such tubes in relations known as trigger circuits and flip-flops, and the present invention utilizes an adaptation of a flip-flop ring to its use where the reception and counting of pulses of numerical significance is desired, it is a special aim of the invention to evolve novel means by which such ring counters are embodied so as to operate with great certainty and effectiveness.

An important aim of the invention contributing to its successful operation with a minimum of impairment or malfunction mathematically, is to effect intercommunication between units having pulse-responsive circuits which are maintained at widely different potentials for their normal conditions, by the communication of pulses from one such unit to another such unit without mutual disturbance of their normal potentials, yet in a most definite manner taking full advantage of the before-mentioned operations of tubes well below or above cut off, or well above minimum conductance conditions (that is close to the saturation state of conductance).

Figure 1:
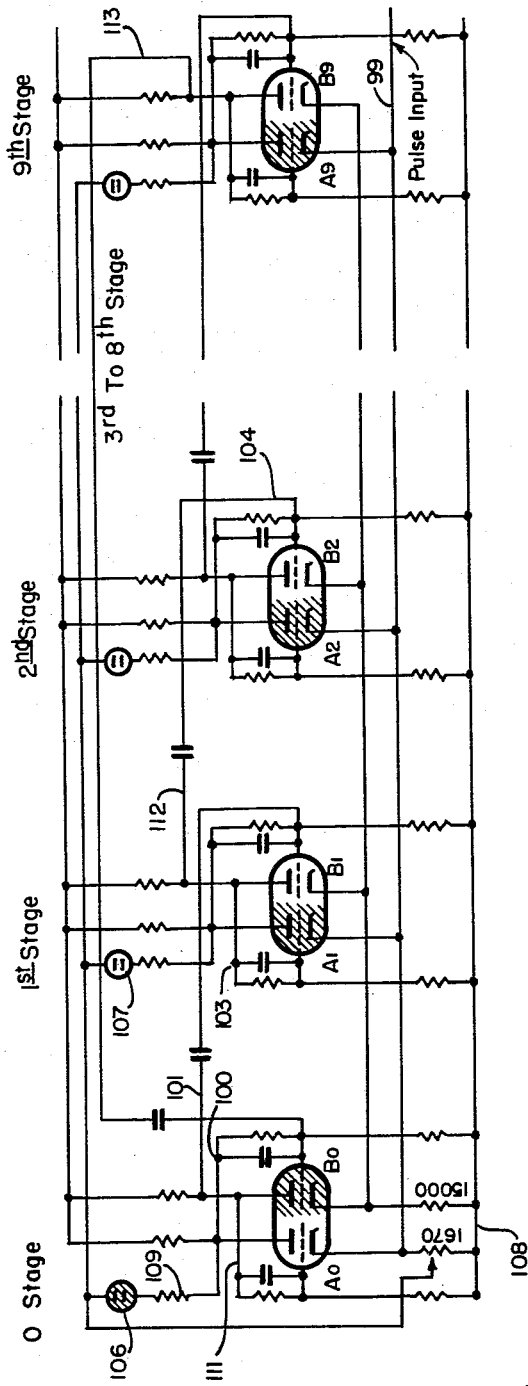
FIG. 1 is the basic circuit of a decade ring counter and stepper ring.

FIG. 1, to which reference is now made, shows a decade ring counter constructed according to the present invention. The decade ring counter illustrated is a ten stage (with two tubes per stage) ring counter with ten different stable states. Each stage has two tubes which will be called respectively tube A and tube B. Only one tube of each stage is conducting. If tube A is conducting that stage will be said to be in state A; if tube B is conducting then that will be said to be in state B. The stable state of the whole ring is with one stage in state B and the other nine stages in state A. The circuits are so arranged that if one stage is in state B and a pulse is received it will go into state A and the next following stage will go into state B.

The two cathode resistors for tubes in state A and tubes in state B are so chosen as to permit only one mode of operation, namely, one stage in state B and the other nine stages in state A.

Pulses that step the ring are negative and are introduced on all the cathodes of the tubes A. Such stepping pulses have little effect on the stages in state A but causes the stage in state B to go into state A. As this stage goes from state B to A a carry-over circuit causes the next following stage to go into state B. The fact that this carry-over pulse (through the 50 mmf. condenser) will be in conflict with the stepping pulse applied to the cathode requires careful design to obtain reliable operation. Thus, the stepping pulse must be of precise shape and duration, and the carry-over pulse must over-ride it. This is accomplished by putting the incoming pulses through a pulse standardizer, disclosed hereinafter and by using the proper circuit parameters in the decade ring circuit.

In FIG. 1, the 0 stage is shown in state B, and its neon lamp 106 is therefore lit, since it is connected between the plate of tube A of stage 0 and the B minus line 108 (conduction of the tubes being indicated by shade lines). As $A_0$ (i.e., tube A of stage 0) is not conducting, its plate voltage is high enough to light neon 106 through resistor 109. All the other stages are in state A, the various circuit potentials being chosen to maintain stability in the condition shown, and therefore the other nine neons are unlit, since the plates of their respective associated tubes are in the conducting condition, and therefore are not at sufficiently high potential to light these neons.

We assume now that a negative pulse of extremely brief duration (e.g., in the order of $10^{-6}$ sec.) is applied from the pulse standardizer to pulse bar 99, of sufficient amplitude to make tube $A_0$ conduct. As the plate voltage of tube $A_0$ begins to fall due to this conduction, a negative pulse along lead 100 applies a negative bias to the grid of $B_0$, which therefore becomes less conductive which in turn raises the voltage (through lead 111) of the grid of $A_0$, in the usual flip-flop action, which continues until stage 0 is changed over to the A state, and neon 106 goes out. At the same time, the rise in potential at the plate of $B_0$ causes a positive pulse to bias the grid of $B_1$ through lead 101, which renders tube $B_1$ conducting and tube $A_1$ non-conducting by the same flip-flop action, thus putting stage 1 into state B and lighting neon 107. As $B_1$ becomes conducting its plate voltage drops, producing a negative pulse on lead 112, but this has no effect on tube $B_2$, which is non-conducting. Note that this counter is shown as a ring counter, that is, each pulse will change the state of the next tube on the right of the "abnormal" one until stage 9 is reached, after which stage 0 is activated, through lead 113, to begin the cycle anew on the next pulse.

It will be obvious that at each stage of the counter voltages are available for actuating other elements of the computer as desired, in the form of static positive or negative voltages or else voltage pulses which change respectively to negative or positive as each stage changes its state.

Figure 2:
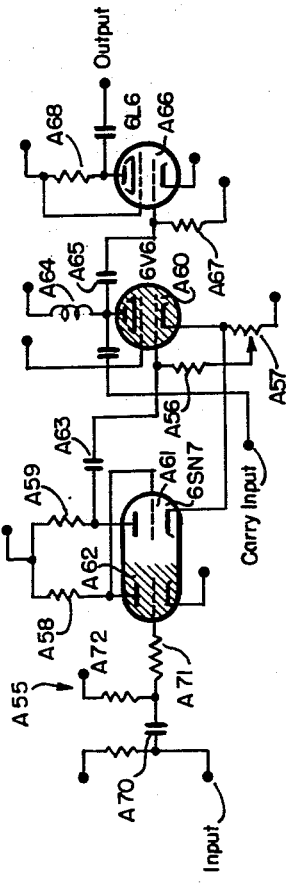
FIG. 2 shows a pulse standardizer circuit.

Referring now to FIG. 2, the pulse standardizer for applying input pulses to line 99 is shown. It has been mentioned that in the operation of a counter it is necessary that the input pulses have a certain shape and magnitude. Distortion of pulses because of the capacitance of interconnecting circuits and because of passage through various gate tubes makes it necessary to use a pulse-standardizing means between some of the circuits. A means adapted includes a flip-flop in which one of its states is only semi-stable.

After an input pulse has flipped the circuit from the stable state shown in FIG. 2, with all tubes reversed in state, it will flip back to its original state in a time determined by the circuit constants and practically independent of the input pulse.

The explanation of this action is as follows: the values of resistors A56, A57 and A58 are such that when tube A60 is conducting the potential drop across resistance A57 causes biasing of the tube A61 at its cathode to cut-off, aided by the condition already existing at the grid of tube A61 due to conduction at the first tube A62. A negative pulse is then applied to the input—the grid of tube A62, to diminish the flow of current through the said tube A62, impressing a positive-going signal on the control grid of the tube A61 to initiate the flow of current producing a negative going potential excursion at the anode terminal of the resistor A59 which cuts off tube A60. Then, after a time which depends on the product A59, A63, tube A60 is no longer biased to cut-off and as it begins to conduct, the increased current and higher potential across resistance A57, acting on cathode of tube A61 begins to bias tube A61 to cut-off again. This change in tube A61 involves a rise in its plate potential which reacts on the control grid of tube A60, and the action is accelerated, bringing tube A60 to full conduction, flipping the circuit back to its original state.

This standardizer includes in its plate circuit an inductance A64, in the present instance a choke of 5 mh. the effect of which on cut-off of tube A60 is to augment the rise of potential at the plate.

This rise in potential is transmitted through A65 to the control grid of A66, causing it to conduct. The duration of this positive signal applied to A66 is almost entirely determined by the parameters A64, A65 and A67 and certain operating voltages, since tube A60 remains non-conducting during this interval. A negative pulse is therefore generated at the plate of tube A66 and appears at the output. Since tubes A61 and A60 constitute a modified flip-flop, it is important to note that the effective plate electrode of tube A60 for this flip-flop action is the screen grid electrode which is held at a fixed potential, and the potential changes of the actual plate electrode of tube A60 have negligible effect on the flip-flop action. The time constant of the flip-flop circuit is made large enough by choice of condenser A63 so that tube A60 will not return to a conducting state until tube A62 is returned to conduction by termination of the input pulse. However, when this occurs no output pulse will be generated because the initiation of conduction in tube A60 will apply a negative pulse to the control grid of A66, and this tube has already returned to a non-conducting state with the decay of potential across the inductor 64.

As a matter of policy the grids in all the tubes such as described in the rings, steppers, gates, inverters, cathode followers, pulse standardizers and the like, throughout the Eniac, are driven to saturation when the tubes are on and they receive biasing potentials exceeding the cut off bias potential by factors of three to four when off. This means the circuits are not amplitude-sensitive, that is, a considerable change in supply potentials and in tube conductance (as might be due to aging) will not affect the reliability of operation.

It should be appreciated that the inherent result of the particular organization of elements in the pulse standardizer of FIG. 2, not only produces a definite pulse of high effectiveness in relation to the initiating pulse to which it responds, but it is also organized with time constant values definitely related to the internal time constants of the ring circuit, so that the speed of response and certainty of performance of the machine are achieved which are so necessary to a mathematical machine in which great reliance is reposed.

The use of a standardized pulse to operate the ring by application of the pulse to the cathode, in addition to the simplification of constructional and manufacturing details, has among others, also the following highly important advantages contributing further to the durability of the machine, its certainty of mathematical operation (so that successive identical computations will render identical numerical results):

(1) Relieves the grids of the capacity loading of the pulse input circuits.

(2) Allows the use of smaller power to drive the ring circuit.

(3) Prevents undesired modes of counting by the degeneration effect resulting from the operation of the activated tubes.

(4) Pulsing the cathode by a negative pulse permits obtaining the pulse from the plate of a drive tube rather than from the cathode, so that the driver tube is not degenerated.

Although only a certain and specific embodiment of this invention has been shown and described, it will be understood that this invention is not to be limited except insofar as is indicated by the scope of the appended claims.

What is claimed is:

1. A counter-ring comprising a plurality of pairs of electronic discharge devices A and B, respectively, each device having at least an anode and cathode and a control grid, each pair being interconnected as a trigger pair only one device of which may be conducting at any given time, so that when A of a given pair is conducting and B non-conducting, a suitable cathode pulse applied to the cathode of A is effective to interchange the conducting and the non-conducting states of the pair from state A conducting to state B conducting, connections between each said pair and an electrically adjacent pair for transmitting a triggering pulse from any one pair to the adjacent pair to change its conducting state from B to A when the said pair changes from the A conducting state to the B conducting state, a common pulse input circuit connected to the A cathode of each pair and circuit parameters for said devices of such value that only one of any adjacent pairs is in the A conducting state at any given time, and inductive means connected to an active element means in intimate electrical association with said counter-ring for receiving pulses to be counted and reshaping said received pulses to produce pulses of optmium characteristics for definite triggering of said counter-ring at maximum rate whereby received pulses may be accurately counted at optimum speed irrespective of wide variation in characteristics of said pulses as received.

2. In a counter or stepper ring for computing systems of the character described, a ring of trigger circuits each including two electron tube triodes each having its grid reactively coupled with the plates of the other, a B source symmetricaly connected to the anodes and cathodes; said ring characterized by a resistance in the plate supply exceedingly high as compared to conventional practice in trigger circuits, and a grid-plate coupling resistance parallel to said reactance coupling which is exceedingly low as compared to conventional practice in trigger circuits, said counter or stepper ring including inductive means and active element means connected for applying a sharp negative pulse commonly to the cathodes of the tubes of the ring, and having a markedly lower potential not less than double that required to fire the triode.

No references cited.